UNITED STATES PATENT OFFICE.

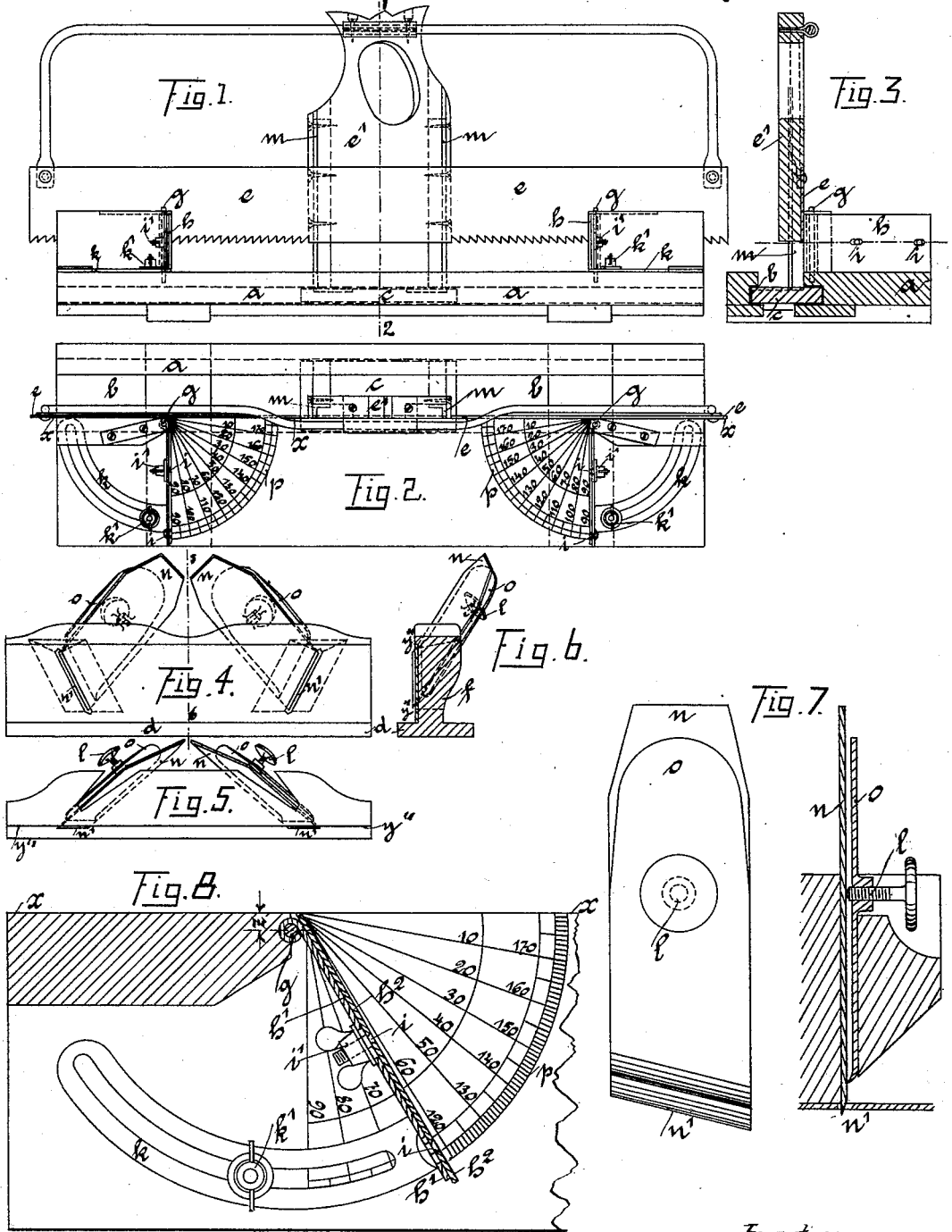

EMIL GUSTAV THEODOR GABRIEL AND JOHANN CARL POHL, OF STEGLITZ, GERMANY.

MITER-BOX.

SPECIFICATION forming part of Letters Patent No. 432,524, dated July 22, 1890.

Application filed August 20, 1889. Serial No. 321,430. (No model.) Patented in Belgium March 20, 1889, No. 85,475, and in France March 21, 1889, No. 196,877.

*To all whom it may concern:*

Be it known that we, EMIL GUSTAV THEODOR GABRIEL and JOHANN CARL POHL, subjects of the King of Prussia and Emperor of Germany, residing at Steglitz, Germany, have invented a certain new and useful Improvement in Miter-Boxes, (for which we have obtained Letters Patent in France, March 21, 1889, No. 196,877, and in Belgium, March 20, 1889, No. 85,475;) and we do hereby declare that the following is a full, clear, and exact description of the invention, which will enable others skilled in the art to which it appertains to make and use the same.

The object of this invention is to provide apparatus by the use of which the workman, without changing his position with regard to the miter-box, may cut and plane both the parts which are to be joined with a miter-joint, or may cut and plane a piece which is to be mitered or beveled from both edges without turning the latter.

The invention consists principally in a miter-box with adjustable rests, and in which the one half is exactly symmetrical in construction with the other half, and, secondarily, in the combination therewith of a tool (saw or plane) the cutting-faces of which are also symmetrically arranged on each side of its center to agree with said molding-box.

Figures 1, 2, and 3 represent the miter-box with inserted saw, being respectively elevation, plan, and section; Figs. 4, 5, and 6, respectively, elevation, plan, and section of the plane, which is inserted into the box after the saw with its sledge has been removed from the same. Fig. 7 illustrates the plane. Fig. 8 shows on an enlarged scale the device for adjustment of the angles.

The box consists of the foot-board $a$, which is provided with a grooved guide $b$, for receiving the sledges $c$ and $d$ for the saw and plane. Vertically to the foot-board are arranged the two pins $g$, to act as axes of revolution for the two miter-rulers. As the edge $x$ $x$ of the guiding-groove $b$ has to remain entirely free, so that the saw and the plane may move along the same without hinderance, the axis of the pins $g$ cannot coincide with the edge $x$, but has to be removed from the edge by the distance $z$, Fig. 8. The miter-ruler $h$, however, has to cut with its edge sharp with the edge $x$, where the saw and the plane travel along, so that during the cutting or planing the molding or fillet does not break in pieces. The ruler consists, therefore, of the two plates $h'$ and $h^2$, Fig. 8. $h'$ is journaled in the axes $g$, and connected with the plate $h^2$ by guiding-pins $i$ and winged nut $i'$ in such a manner that the latter can be moved. In this manner one can adjust the miter-lines so that the edge of the plate $h^2$ always extends exactly as far as the saw or plane running along the same. The lines dividing the degrees of the protractor are ruled as tangents to a circle the center of which is in the axis of the pin $g$ and the radius of which is the sum of the radius of the pin $g$ and the thicknesses of the plates $h'$ and $h^2$, so that in fact the said dividing-lines coincide with positions assumed by the outer face of the plate $h^2$. The saw $e$ cuts forward toward one end and backward toward the other and is fastened to the handle $e'$, situated in the center. The handle has guiding-furrows for the angle-irons $m$, which latter are secured to the sledge $c$, and guide vertically the saw during its up and down motion. The horizontal guidance of the saw is performed by the sledge $c$ and by the guiding-support $b$. By this arrangement the saw is always guided along the edge of the ruler $h$, which enables an exact cut to be made. The plane $f$ is inserted with its sledge $d$ into the guiding-notch $b$ of the box $a$ after the saw has been removed, so that its side surface, provided with a metal plate, slides along the edge of the ruler $h$. As the plane, like the saw, has to cut in both directions, two plane-irons have been arranged obliquely so that their knives $n'$ adopt a slanting position, Fig. 4, but naturally project from the side surface of the plane parallel to the edge of the ruler $h$. By this device the irons do not cut at the same time with their entire cutting-surface, thus working easier; besides, moldings or fillets with carved work cannot be damaged, as the saw always begins on the molding or fillet from above. The adjustment of the iron is done by the adjusting-screw $b$, which separates the plane-iron $n$ and the fastening-iron $o$, situated behind, so that both irons may lie firmly against the wood surrounding the plane.

*Use of the miter-box:* First, the miter-rulers $h$ are adjusted to the desired angle by means of the bow $k$, and the plates $h^2$ are shifted with their front edge exactly as far as the edge $x\,x$. Then the molding or fillet is placed against one of the rulers $h$ and cut off with the forward end of the saw. Then the other end of the molding or fillet is placed against the second ruler $h$ and cut off with the back part of the saw. Now the saw is exchanged for the plane and the two surfaces of the molding or fillet planed by placing the latter first against the one and then against the other ruler. When cutting several moldings or fillets to the same angle, they are all first sawed and afterward planed.

What we claim, and desire to secure by Letters Patent, is—

1. A miter-box comprising, in combination, a foot-board $a$, with a guide-edge $x$ for the tool, two adjustable miter-rulers $h'$, symmetrically pivoted at $g$ near the said guide-edge, each having a sliding face $h^2$, for the purpose set forth.

2. A miter-box comprising, in combination, a foot-board $a$, with a guide-edge $x$ for the tool, two adjustable miter-rulers $h'$, symmetrically pivoted at $g$ near the said guide-edge, each having a sliding face $h^2$, for the purpose set forth, two symmetrically-placed protractors $p$, curved plates $k$, and set-clamps $k'$.

In witness whereof we have signed this specification in the presence of two subscribing witnesses.

EMIL GUSTAV THEODOR GABRIEL.
   JOHANN CARL POHL.

Witnesses:
 B. ROI,
 F. VON VERRIN.